United States Patent
Tones et al.

(10) Patent No.: US 9,869,395 B2
(45) Date of Patent: Jan. 16, 2018

(54) SHAFT SEALING APPARATUS AND ASSOCIATED METHODS

(71) Applicant: Garlock Sealing Technologies, LLC, Palmyra, NY (US)

(72) Inventors: Christopher E. Tones, Palmyra, NY (US); Randy Matthys, Newark, NY (US); Patrick Rhodes, Victor, NY (US); Howard Lockhart, Romulus, NY (US); Bruce Stratton, Clifton Springs, NY (US)

(73) Assignee: Garlock Sealing Technologies, LLC, Palmyra, NY (US)

(*) Notice: Subject to any disclaimer, the term of this patent is extended or adjusted under 35 U.S.C. 154(b) by 0 days.

(21) Appl. No.: 14/620,061

(22) Filed: Feb. 11, 2015

(65) Prior Publication Data

US 2015/0240949 A1    Aug. 27, 2015

Related U.S. Application Data

(60) Provisional application No. 61/944,886, filed on Feb. 26, 2014.

(51) Int. Cl.
| | |
|---|---|
| *F16J 15/3232* | (2016.01) |
| *F16J 15/3252* | (2016.01) |
| *F16J 15/322* | (2016.01) |
| *F16J 15/328* | (2016.01) |
| *F16J 15/3212* | (2016.01) |

(52) U.S. Cl.
CPC ......... *F16J 15/3232* (2013.01); *F16J 15/322* (2013.01); *F16J 15/328* (2013.01); *F16J 15/3212* (2013.01); *F16J 15/3252* (2013.01); *Y10T 29/49297* (2015.01)

(58) Field of Classification Search
CPC .. F16J 15/3284; F16J 15/3212; F16J 15/3216; F16J 15/322; F16J 15/32
See application file for complete search history.

(56) References Cited

U.S. PATENT DOCUMENTS

| | | | | |
|---|---|---|---|---|
| 2,202,944 A | * | 6/1940 | Boyd | 277/346 |
| 3,345,076 A | * | 10/1967 | Wheelock | 277/550 |
| 3,511,512 A | | 1/1968 | Wheelock | |
| 4,844,255 A | * | 7/1989 | Schmitt | 277/562 |
| 5,137,285 A | * | 8/1992 | Pick | 277/503 |
| 5,346,230 A | | 9/1994 | Schumacher et al. | |
| 5,456,475 A | * | 10/1995 | Abraham et al. | 210/171 |

(Continued)

OTHER PUBLICATIONS

International Search Report and Written Opinion of the U.S. Searching Authority, International Patent Application No. PCT/US2015/015656, dated Apr. 22, 2015. 10 pages.

*Primary Examiner* — Eugene G Byrd
(74) *Attorney, Agent, or Firm* — Perkins Coie LLP

(57) ABSTRACT

An improved sealing apparatus and associated methods are disclosed herein. The sealing apparatus includes a housing defining a center axis, an alignment element positioned around the center axis, and a sealing element fixedly attached with the alignment element. The alignment element has first and second protrusions extending toward the center axis. The sealing element has a third protrusion extending toward the center axis. The alignment element is made of a first material with less elasticity than a second material of which the sealing element is made.

15 Claims, 6 Drawing Sheets

(56) References Cited

U.S. PATENT DOCUMENTS

| | | | |
|---|---|---|---|
| 5,957,461 A * | 9/1999 | Ulrich | 277/569 |
| 6,290,235 B1 | 9/2001 | Albertson | |
| 6,367,812 B1 | 4/2002 | Reinhardt et al. | |
| 2003/0122317 A1* | 7/2003 | Andersson | 277/440 |
| 2005/0151322 A1* | 7/2005 | Kobayashi et al. | 277/309 |
| 2007/0194538 A1 | 8/2007 | Munekata et al. | |
| 2009/0146379 A1 | 6/2009 | Foster et al. | |
| 2009/0230630 A1* | 9/2009 | Kondo et al. | 277/553 |
| 2010/0237566 A1* | 9/2010 | Balsells et al. | 277/550 |
| 2011/0037234 A1* | 2/2011 | Balsells et al. | 277/562 |
| 2011/0140366 A1* | 6/2011 | Kirchner | 277/377 |
| 2011/0140369 A1* | 6/2011 | Lenhert | 277/589 |
| 2011/0272892 A1* | 11/2011 | Grace et al. | 277/395 |
| 2014/0265139 A1* | 9/2014 | Dilmaghanian et al. | 277/309 |
| 2015/0054227 A1* | 2/2015 | Kreutzer et al. | 277/573 |

* cited by examiner

SHAFT SEALING APPARATUS AND ASSOCIATED METHODS

CROSS-REFERENCE TO RELATED PATENT APPLICATIONS

The present application claims priority to U.S. Provisional Patent Application Ser. No. 61/944,886, filed Feb. 26, 2014, the disclosure of which is incorporated herein by reference as if set out in full.

BACKGROUND

Shaft sealing apparatuses, such as oil seals, are widely used in valve or pump systems, which usually include reciprocal shafts or rods. Conventional shaft sealing apparatuses include braided packing materials, dual-lip elastomeric seals, or dual-lip rod scrappers. Shaft sealing apparatuses, in these systems, are used to prevent lubricants from leaking during operations and to remove undesirable external substances.

However, conventional designs may not perform their functions well under aggressive operating environments, such as a cold (e.g., 40° F.) or hot environment (e.g., 200° F.). In addition, shaft alignment can be problematic if shaft sealing apparatuses interfere with normal operations of reciprocal shafts. Therefore, improved shaft sealing apparatuses and associated methods are desirable.

SUMMARY

The technology of the present application is directed to an improved sealing apparatus and associated methods for manufacturing the improved sealing apparatus. The sealing apparatus can include a housing element that defines a center axis, an alignment element positioned around the center axis, and a sealing element fixedly attached with the alignment element. The alignment element has a first protrusion for preventing undesirable external substances (e.g., contaminants) and for removing excessive lubricants from a reciprocal shaft. The alignment element further has a second protrusion for aligning the reciprocal shaft. The sealing element has a third protrusion for facilitating sealing lubricants being placed on a lube side of the sealing apparatus.

The technology of the present application discloses a method of manufacturing a sealing apparatus. The method of manufacturing the sealing apparatus can include: forming an alignment element having a first protrusion, a second protrusion, and a first contact surface; forming a sealing element having a third protrusion and a second contact surface corresponding to the first contact surface; at least partially positioning the alignment element inside a first housing element which has a first angled portion to secure the alignment element; at least partially positioning the sealing element inside the first housing element which has a second angled portion to secure the sealing element; and fixedly attaching a second housing element with the first housing element and the sealing element. The second housing can have a third angled portion to secure the sealing element. The alignment element can be made of a first material and the sealing element can be made of a second material having less rigidity than the first material.

This Summary is provided to introduce a selection of concepts in a simplified form. These concepts are further described below in the Detailed Description. This Summary, and the foregoing Background, is not intended to identify key aspects or essential aspects of the claimed subject matter. Moreover, this Summary is not intended for use as an aid in determining the scope of the claimed subject matter. These and other aspects of the present technology will be apparent after consideration of the Detailed Description and Drawings herein.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application is described with specific reference to an improved sealing apparatus for use with shaft systems. The sealing apparatuses are described herein in connection with corresponding shaft systems, but the sealing apparatuses can be used in other systems having any elongated member or rod that needs to be sealed. The technology will be described with reference to methods of sealing shaft or plunger assemblies or to methods of manufacturing improved sealing assemblies. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

Figure 1:
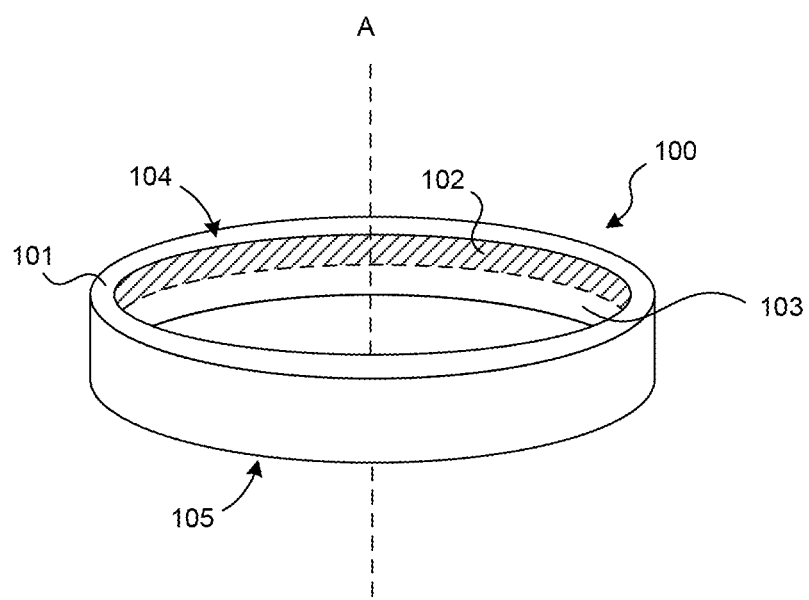
FIG. 1 illustrates a sealing apparatus in accordance with an exemplary embodiment of the present technology.

FIG. 1 illustrates a sealing apparatus 100 in accordance with an exemplary embodiment of the present technology. The sealing apparatus 100 can be used to seal a reciprocal shaft (e.g., a pony rod) in a pump system (e.g., a fracturing pump system). The sealing apparatus 100 also can be used to seal an elongated member or rod in any suitable systems. As shown in FIG. 1, the sealing apparatus 100 includes a housing 101 that defines a center axis A, a sealing element 102 (details to be discussed below), and an alignment element 103 (details to be discussed below). The housing 101 can at least partially accommodate the sealing element 102 and the alignment element 103. The sealing element 102 is positioned on a lube side 104 (e.g., where lubricants are stored) of the sealing apparatus 100. The alignment element 103 is positioned on an external side 105 (e.g., the side exposed to an outside environment) of the sealing apparatus 100. The sealing apparatus 100 can be used to seal a shaft, rod or other devices with similar functions. In some embodiments, the sealing apparatus 100 can prevent undesirable substances (e.g., external contaminants) at the external side 105 from entering into the lube side 104. In some embodiments, the sealing apparatus 100 can prevent lubricants placed at the lube side 104 from leaking to the external side 105.

Figure 2A:
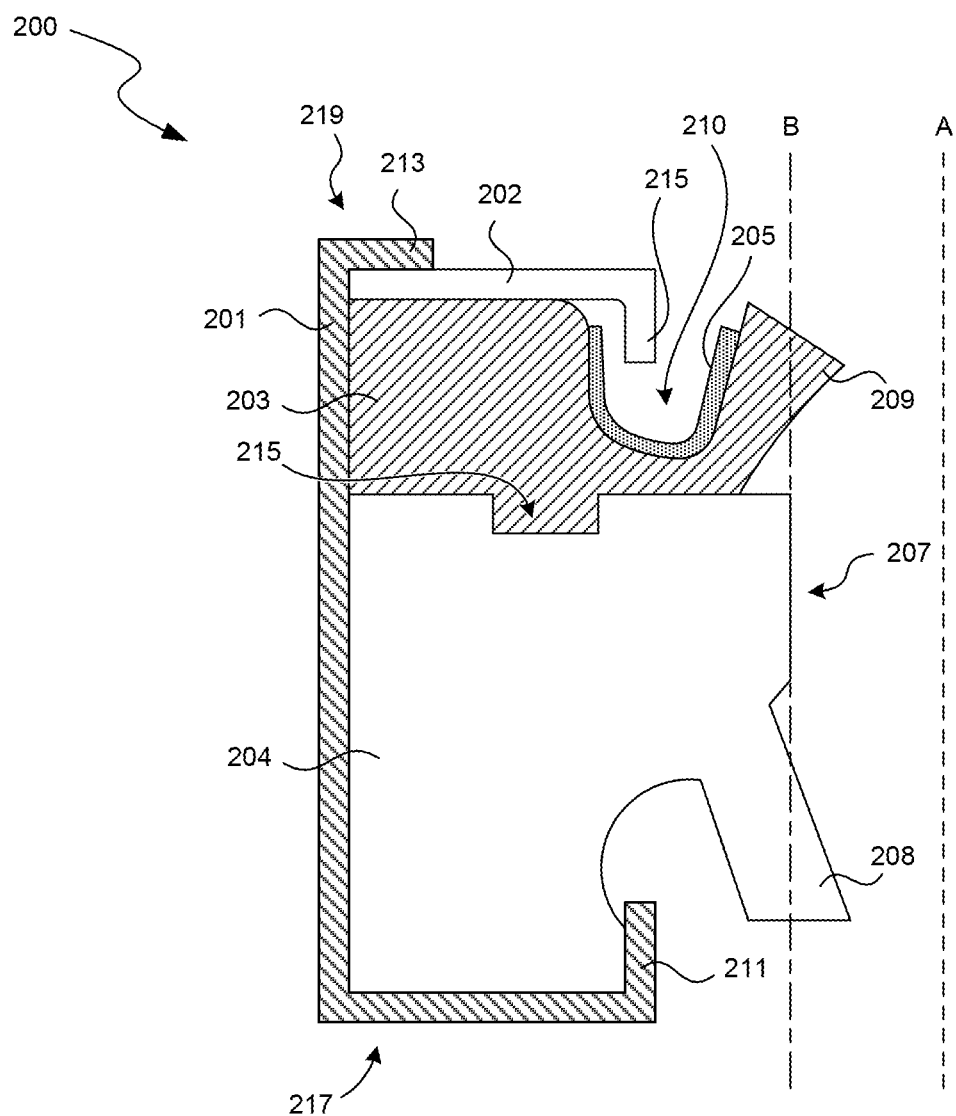
FIG. 2A is a partial cross-sectional view of a sealing apparatus in accordance with an exemplary embodiment of the present technology.

FIG. 2A is a partial cross-sectional view of a sealing apparatus 200 in accordance with an exemplary embodiment of the present technology. In some embodiments, the sealing apparatus 200 can be an oil seal or apparatus with similar functions. As shown in FIG. 2A, the sealing apparatus 200 includes a first housing element 201, a second housing element 202, a sealing element 203, an alignment element 204, and a positioning element 205. In the illustrated embodiment, the first housing element 201 and the second housing element 202 together accommodate the alignment element 204 and the sealing element 203.

As shown in FIG. 2A, the alignment element 204 is positioned at an external side 217 of the sealing apparatus 200, and the sealing element 203 is positioned at a lube side 219 of the sealing apparatus 200. In the illustrated embodiment, the alignment element 204 and the sealing element 203 can be fixedly attached by a mechanical lock 206. As shown in FIG. 2A, the mechanical lock 206, such as a tongue and groove lock as shown, can be defined by and formed with the groove 216 on the alignment element 204 and the tongue 222 on the sealing element 203. In other embodiments, the alignment element 204 and the sealing element 203 can be fixedly attached by other suitable means such as glue, adhesives, cross-linking, or the like rather than or in addition to the mechanical lock 206.

The alignment element 204 can be made of a first material, and the sealing element 203 can be made of a second material that has greater elasticity (or less rigidity) than the first material. In some embodiments, the first material and the second material can both be plastic materials. In some embodiments, the first material and/or the second material can be polyurethane. In other embodiments, the first material and/or the second material can be other types of elastomeric materials depending on chemical compatibilities (e.g., chemical compatibilities with lubrication and/or possible external contaminants).

In some embodiments, the first material can be a material with rigidity of about 60-120 Shore A Durometers, and the second material can be a material with rigidity of 50-100 Shore A Durometers. In other embodiments, the rigidity of the first material can be about 90 Shore A Durometers, and the rigidity of the second material can be about 75 Shore A Durometers. In some embodiments, the rigidity of the first material can be no less than 70 Shore A Durometers, and the rigidity of the second material can be no less than 60 Shore A Durometers.

As shown in FIG. 2A, the alignment element 204 can have a first protrusion 207 that contacts with a shaft (not shown) movable along a predetermined direction (e.g., along the center axis A). The first protrusion 207 can be formed along an axis B which is parallel to the center axis A. The first protrusion 207 can facilitate the alignment of the shaft. More particularly, the first protrusion 207 can facilitate keeping the shaft (not shown) substantially in line with the center axis A. In the illustrated embodiment, the first protrusion 207 extends toward the center axis A in a direction substantially perpendicular to the center axis A.

The alignment element 204 can further have a second protrusion 208 that facilitates removing undesirable substance (e.g., external contaminants) from the shaft (not shown). In the illustrated embodiment, the second protrusion 208 extends toward the external side 217 of the sealing apparatus 200. In the illustrated embodiment, the second protrusion 208 extends toward the center axis A in an angled direction such that the second protrusion 208 extends radially inwardly of the first protrusion 207 from the axis B towards the axis A. In some embodiments, the second protrusion 208 can include a scraper for removing undesirable external contaminants on the shaft (not shown). The second protrusion 208 is separated from the body of the alignment element 204 by a gap 220, or scooped section. The gap 220 allows the shaft (not shown) to press the second protrusion 208 causing the second protrusion 208 to move and compress the gap 220. The second protrusion 208 will be biased to move back to its original position providing a good contact between the second protrusion 208 and the shaft (not shown).

In the illustrated embodiment, the sealing element 203 can have a third protrusion 209 that can prevent lubricants placed on the lube side 219 of the sealing apparatus 200 from leaking to the external side 217 of the sealing apparatus 200. In the illustrated embodiment, the third protrusion 209 extends toward the lube side 219 of the sealing apparatus 200 in an angled direction such that the third protrusion 209 extends radially inwardly of the first protrusion 207 from the axis B towards the axis A.

The positioning element 205 can be positioned in a recess 210 defined by the space between the third protrusion 209 and the body of the sealing element 203. The positioning element 205 can be used to facilitate the third protrusion 209 being in close contact with the shaft (not shown). In some embodiments, the positioning element 205 can be a finger spring, a garter spring, or devices with similar functions. The positioning element is placed in compression such that the positioning element 205 tends to push the third protrusion 209 inwardly toward axis A. In some embodiments, the positioning element 205 can be made, at least partially, of stainless steel. In other embodiments, the positioning element 205 can be made, at least partially, of other metallic materials such as brass or carbon steel.

In the illustrated embodiment shown in FIG. 2A, the first housing element 201 can have a first angled portion 211 to facilitate securing and/or positioning the alignment element 204. The first angled portion 211 may extend into the gap 220. The first housing element 201 can further have a second angled portion 213 to facilitate securing and/or positioning the sealing element 203. As shown in FIG. 2A, the second housing element 202 can have a third angled portion 215 to facilitate securing and/or positioning the sealing element 203. The third angled portion 215 may extend into the recess 210. In other embodiments, the first, second, and third angled portions 211, 213, and 215 can have various shapes or angles depending on different designs.

Figure 2B:
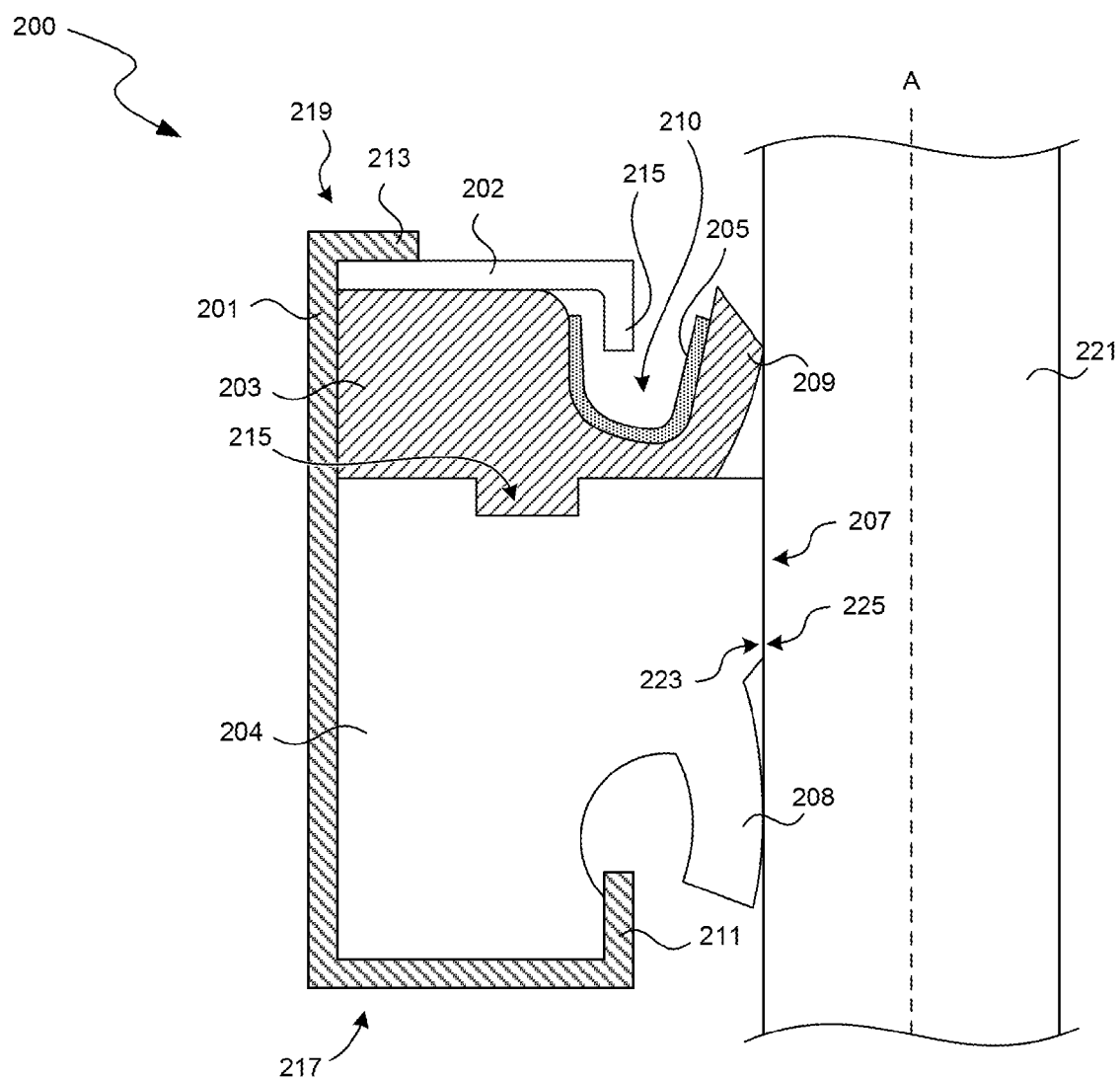
FIG. 2B is a partial cross-sectional view of the sealing apparatus described in FIG. 2A.

FIG. 2B is a partial cross-sectional view of the sealing apparatus 200 described in FIG. 2A. FIG. 2B illustrates how the sealing apparatus 200 can be in contact with a shaft 221. As shown in FIG. 2B, the shaft 221 can move reciprocally along the center axis A during operation. Sufficient lubricants can be positioned at the lube side 219 of the sealing apparatus 200. In the illustrated embodiment, the first protrusion 207 can have a flat surface 223 in contact with an outer surface 225 of the shaft 221. The flat surface 223 can provide guidance and alignment for the shaft 221 when the shaft 221 moves reciprocally during operation.

As shown in FIG. 2B, the second protrusion 208 is pushed (and/or compressed) by the shaft 221 away from the center axis A radially outward. During operation, the shaft 221, which moves reciprocally along the center axis A, can bring certain undesirable outside substances (e.g., contaminants) from the external side 217 toward the lube side 219. By contacting the shaft 221, the second protrusion 208 can remove these undesirable substances from the outer surface 225. In various embodiments, the second protrusion 208 can have various shapes and/or different extending angles, depending on substance-removal efficiency or other relevant factors (e.g., types of materials that form the second protrusion 208).

As shown in FIG. 2B, the third protrusion 209 is pushed (and/or compressed) by the shaft 221 away from the center axis A and closely contacts the outer surface 225 of the shaft 221. By contacting the shaft 221, the third protrusion 209 can prevent lubricants placed at the lube side 219 from leaking to the external side 217. In various embodiments, the third protrusion 209 can have different shapes or different extending angles, depending on various design factors (e.g., different target leakage-prevention levels or chemical capacities of relevant materials). As can be appreciated, the positioning element 205 is further compressed, or folded, as a function of placement of the shaft 221. The positioning element 205 provides additional sealing force to facilitate the sealing between the third protrusion 209 and the outer surface 225 of the shaft 221.

Figure 3:
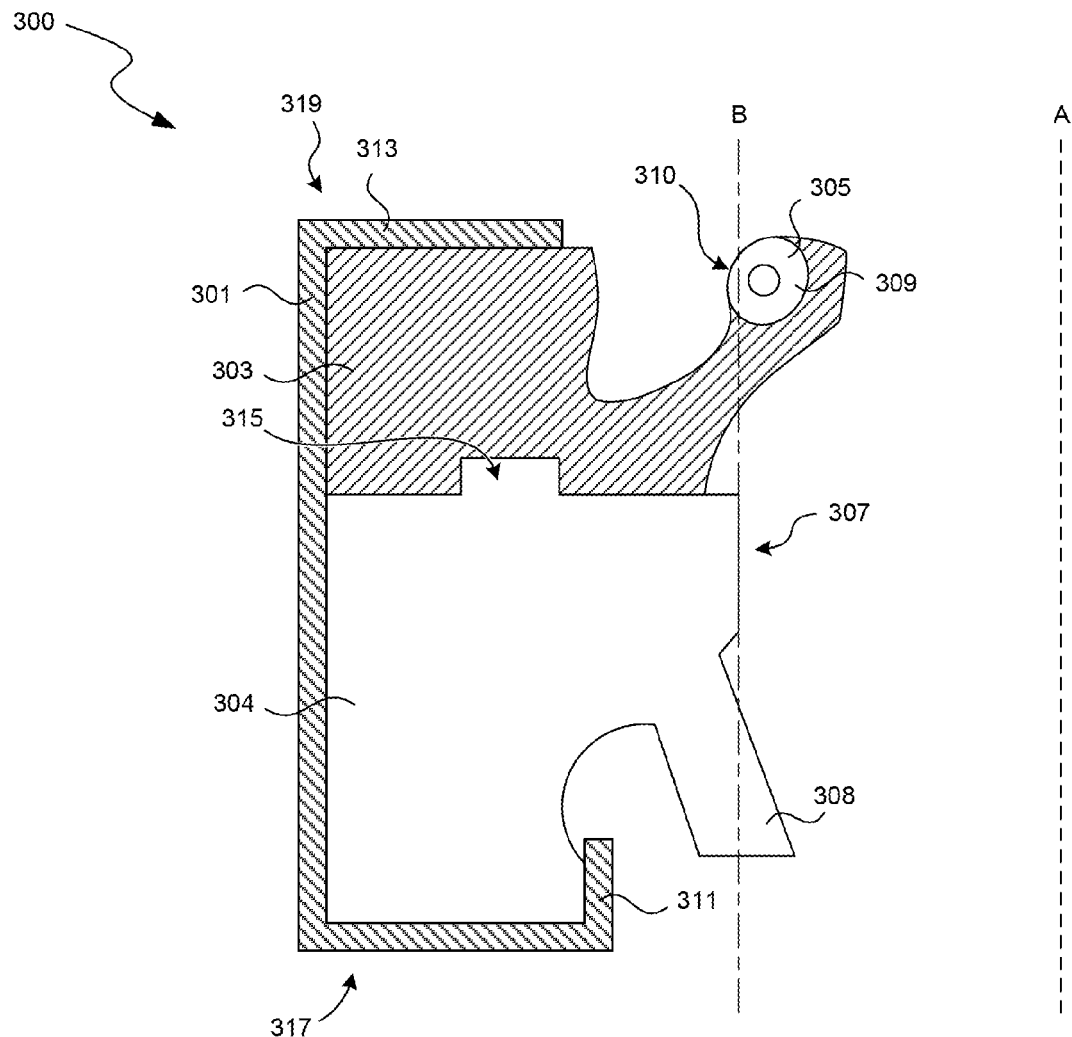
FIG. 3 is a partial cross-sectional view of another sealing apparatus in accordance with an exemplary embodiment of the present technology.

FIG. 3 is a partial cross-sectional view of another sealing apparatus 300 in accordance with an exemplary embodiment of the present technology. In the illustrated embodiment, the sealing apparatus 300 can include a housing 301, a sealing element 303, an alignment element 304, and a positioning element 305. In the illustrated embodiment, the housing 301 accommodates, at least partially, the alignment element 304 and the sealing element 303. The housing 301 can have a first angled portion 311 to facilitate securing the alignment element 304 and a second angled portion 313 to facilitate securing the sealing element 303.

In the illustrated embodiment, the alignment element 304 is positioned at an external side 317 of the sealing apparatus 300, and the sealing element 303 is positioned at a lube side 319 of the sealing apparatus 300. The alignment element 304 and the sealing element 303 are fixedly attached by a mechanical lock 306, such as a tongue and groove lock as shown, defined by and formed with the groove 322 on the sealing element 303 and the tongue 316 on the alignment element 304. In other embodiments, the alignment element 304 and the sealing element 303 can be fixedly attached by other suitable means such as glue, adhesives, cross linking, or the like either separately or in combination with the mechanical lock 306.

As shown in FIG. 3, the alignment element 304 can have a first protrusion 307 that contacts with a shaft (not shown) movable along a predetermined direction (e.g., the center axis A). The first protrusion 307 can be formed along an axis B which is parallel to the center axis A. The first protrusion 307 can facilitate the alignment of the shaft. In the illustrated embodiment, the first protrusion 307 extends toward the center axis A in a direction substantially perpendicular to the center axis A. The alignment element 304 can have a second protrusion 308 that facilitates removing undesirable substances (e.g., external contaminants) from the shaft (not shown). In the illustrated embodiment, the second protrusion 308 extends toward the external side 317 of the sealing apparatus 300. In the illustrated embodiment, the second protrusion 308 extends toward the center axis A in an angled direction. In some embodiments, the second protrusion 308 can include a scraper for removing undesirable external contaminants on the shaft (not shown). The second protrusion 308 is separated from the body of the alignment element 304 by a gap 320 that allows for the second protrusion 308 to flex towards the body of the alignment element 304.

In the illustrated embodiment, the sealing element 303 can have a third protrusion 309 that can prevent lubricants placed on the lube side 319 of the sealing apparatus 300 from leaking to the external side 317 of the sealing apparatus 300. In the illustrated embodiment, the third protrusion 309 extends toward the lube side 319 of the sealing apparatus 300 in an angled direction. The third protrusion 309 is separated from the body of the sealing element 303 by a recess 310.

The positioning element 305 can be positioned in the recess 310 defined by the sealing element 303. The positioning element 305 can be used to facilitate the third protrusion 309 being in close contact with the shaft (not shown). In some embodiments, the positioning element 305 can be a garter spring or devices with similar functions tending to cause constriction of the positioning element 305 about the shaft (not shown). In some embodiments, the positioning element 305 can be made, at least partially, of stainless steel. In other embodiments, the positioning element 305 can be made, at least partially, of other metallic materials such as brass or carbon steel.

In the illustrated embodiment, shown in FIG. 3, the housing 301 can have a first angled portion 311 to facilitate securing and/or positioning the alignment element 304. The housing 301 can further have a second angled portion 313 to facilitate securing and/or positioning the sealing element 303. In other embodiments, the first and second angled portions 311, 313 can have various shapes or angles depending on different designs.

Figure 4:
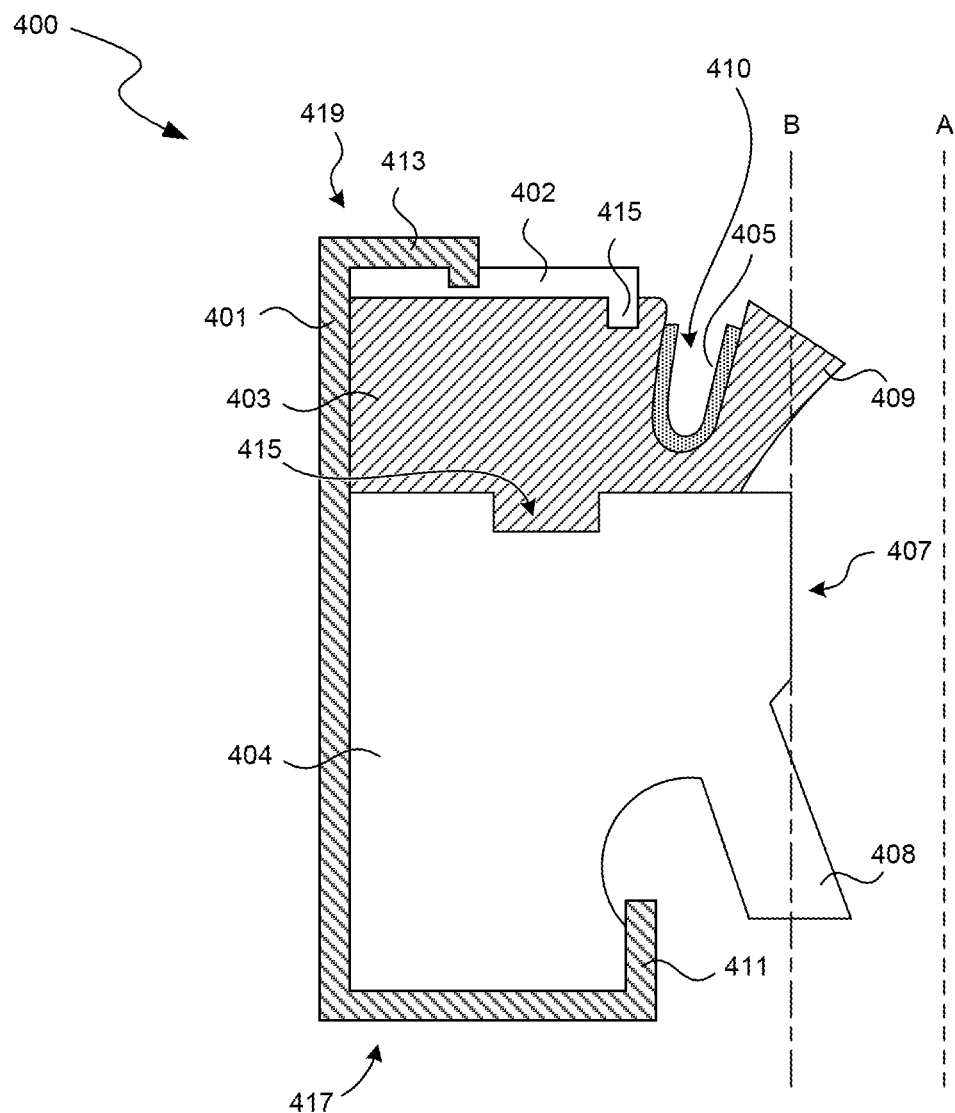
FIG. 4 is a partial cross-sectional view of yet another sealing apparatus in accordance with an exemplary embodiment of the present technology.

FIG. 4 is a partial cross-sectional view of yet another sealing apparatus 400 in accordance with an exemplary embodiment of the present technology. In the illustrated embodiment, the sealing apparatus 400 can include a first housing element 401, a second housing element 402, a sealing element 403, an alignment element 404, and a positioning element 405. In the illustrated embodiment, the first housing element 401 and the second housing element 402 together accommodate the alignment element 404 and the sealing element 403.

As shown in FIG. 4, the alignment element 404 is positioned at an external side 417 of the sealing apparatus 400, and the sealing element 403 is positioned at a lube side 419 of the sealing apparatus 400. In the illustrated embodiment, the alignment element 404 and the sealing element 403 can be fixedly attached by a locking mechanism 406. In the illustrated embodiment shown in FIG. 4, the locking mechanism 406 can include a protrusion defined by the sealing element 403 and a recess defined by the alignment element 404. In other embodiments, the locking mechanism 406 can include a protrusion defined by the alignment element 404 and a recess defined by the sealing element 403. In some embodiments, the sealing element 403 and the alignment 404 can be secured by the locking mechanism 406 without housing elements 401, 402.

As shown in FIG. 4, the alignment element 404 can have a first protrusion 407 that contacts with a shaft (not shown) movable along a predetermined direction (e.g., the center axis A). The first protrusion 407 can be formed along an axis B which is parallel to the center axis A. The first protrusion 407 can facilitate the alignment of the shaft. In the illustrated embodiment, the first protrusion 407 extends toward the center axis A in a direction substantially perpendicular to the center axis A. The alignment element 404 can have a second protrusion 408 that facilitates removing undesirable substances (e.g., external contaminants) from the shaft (not shown). In the illustrated embodiment, the second protrusion 408 extends toward the external side 417 of the sealing apparatus 400. In the illustrated embodiment, the second protrusion 408 extends toward the center axis A in an angled direction. In some embodiments, the second protrusion 408 can include a scraper for removing undesirable external contaminants on the shaft (not shown). The second protrusion 408 is separated from the body of the alignment element 404 by a gap 420 that allows for the second protrusion 408 to flex towards the body of the alignment element 404.

In the illustrated embodiment, the sealing element 403 can have a third protrusion 409 that can prevent lubricants placed on the lube side 419 of the sealing apparatus 400 from leaking to the external side 417 of the sealing apparatus 400. In the illustrated embodiment, the third protrusion 409 extends toward the lube side 419 of the sealing apparatus 400 in an angled direction. The positioning element 405 can be positioned in a recess 410 defined by the sealing element 403. The positioning element 405 can be used to facilitate the third protrusion 409 being in close contact with the shaft (not shown). In some embodiments, the positioning element 405 can be a finger spring or devices with similar functions.

In the illustrated embodiment shown in FIG. 4, the first housing element 401 can have a first angled portion 411 to facilitate securing and/or positioning the alignment element 404. The first housing element 401 can further have a second angled portion 413 to facilitate securing and/or positioning the second housing element 402. The second housing element 402 can have a third angled portion 415 to facilitate securing and/or positioning the sealing element 403. In other embodiments, the first, second, and third angled portions 411, 413, and 415 can have various shapes or angles depending on different designs.

Figure 5:
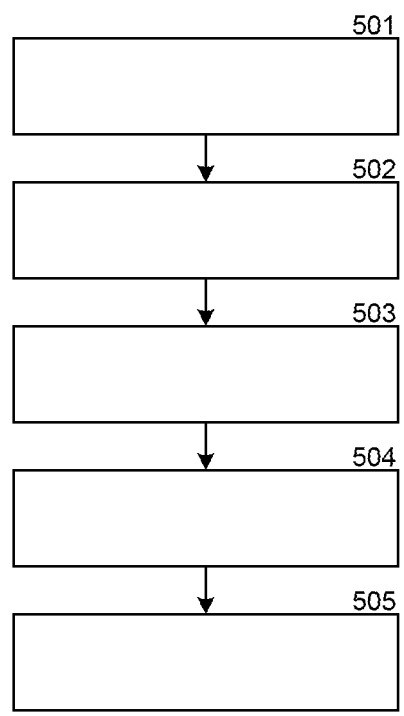
FIG. 5 is a flowchart depicting a method in accordance with an exemplary embodiment of the present technology.

FIG. 5 is a flowchart depicting a method 500 in accordance with an exemplary embodiment of the present technology. The method 500 is directed to a method of manufacturing a sealing apparatus that can be used to seal and align a reciprocal shaft or rod in a pump or other similar systems. The method 500 can start at block 501 by forming an alignment element having a first protrusion, a second protrusion, and a first contact surface. In the illustrated embodiment, the alignment element is made of a first material.

The method 500 can then continue to block 502 by forming a sealing element having a third protrusion and a second contact surface corresponding to the first contact surface. The alignment element can be made of a second material that has less rigidity (or greater elasticity) than the first material. In some embodiments, the first material and the second material can both be plastic materials. In some embodiments, the first material and/or the second material can be polyurethane. In other embodiments, the first material and/or the second material can be other types of elastomeric materials depending on chemical compatibilities (e.g., chemical compatibilities with lubrication and/or possible external contaminants).

At block 503, the method 500 can proceed by at least partially positioning the alignment element inside a first housing element. In some embodiments, the method 500 can further include securing the alignment element by a first angled portion of the first housing element. At block 504, the method 500 can proceed by at least partially positioning the sealing element inside the first housing element. In some embodiments, the method 500 can further include securing the sealing element by a second angled portion of the first housing element.

At block 505, the method 500 can end by fixedly attaching a second housing element with the first housing element and the sealing element. In some embodiments, the method 500 can further include securing the sealing element by a third angled portion of the second housing element. In some embodiments, the method 500 can further include a step of forming a flat surface on the first protrusion for facilitating alignment.

In some embodiments, the method 500 can further include extending the first protrusion toward a center axis defined by the first housing element. In some embodiments, the method 500 can further include a step of extending the second protrusion toward an external side of the sealing apparatus or extending the third protrusion towards a lube side of the sealing apparatus. The method 500 can further include a step of fixedly attaching the alignment element and the sealing element by a locking mechanism. In some embodiments, the method 500 can further include fixedly attaching the alignment element and the sealing element by a protrusion defined by the alignment element and a recess defined by the sealing element. In other embodiments, the method 500 can further include fixedly attaching the alignment element and the sealing element by a protrusion defined by the sealing element and a recess defined by the alignment element.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A sealing apparatus, comprising:
   a housing defining a center axis, the housing comprising:
      a first housing element comprising a first angled portion aligned in parallel to the central axis and a second angled portion aligned in parallel to the central axis; and
      a second housing element having a third angled portion aligned in parallel to the central axis and located opposite to the first angled portion, the second housing element being secured by the second angled portion;
   an alignment element positioned around the center axis and at least partially inside the housing, the alignment element being secured by the first angled portion, the alignment element having a first protrusion extending in front of and at least partially across a recess formed in the alignment element, the alignment element being at least partially made of a first material; and
   a sealing element positioned around the center axis and at least partially in the housing, the sealing element being fixedly attached with the alignment element, the sealing element having a second protrusion extending toward the center axis, the sealing element being at least partially made of a second material; and
   wherein the first material has less elasticity than the second material;
   wherein a first radial distance between the first angled portion relative to the center axis is smaller than a second radial distance between the second angled portion relative to the center axis; and
   wherein a third radial distance between the third angled portion relative to the center axis is generally the same as the first radial distance.

2. The sealing apparatus of claim 1, wherein the first protrusion is configured to at least partially remove an external substance from a reciprocating shaft.

3. The sealing apparatus of claim 1, wherein the first protrusion extends toward an external side of the sealing apparatus.

4. The sealing apparatus of claim 1, wherein the first protrusion includes a scrapper.

5. The sealing apparatus of claim 1, wherein the second protrusion is configured to facilitate sealing a lubricant located on a lube side of the sealing apparatus.

6. The sealing apparatus of claim 1, wherein the second protrusion extends towards a lube side of the sealing apparatus.

7. The sealing apparatus of claim 1, further comprising a positioning element positioned in an axially-oriented recess defined by a body of the sealing element and the second protrusion.

8. The sealing apparatus of claim 1, wherein the first angled portion is located at a radially-inner side of the sealing apparatus to secure the alignment element, and wherein the second angled portion is aligned to secure the sealing element.

9. The sealing apparatus of claim 1, wherein the second angled portion located at a radially-inner side of the sealing apparatus to secure the sealing element, and wherein the third angled portion is located at a lube side of the sealing apparatus to secure the sealing element.

10. The sealing apparatus of claim 1, wherein the alignment element and the sealing element are fixedly attached by a locking mechanism.

11. A shaft system, comprising:
    a housing defining a center axis, the housing comprising:
       a first housing element comprising a first angled portion aligned in parallel to the central axis and a second angled portion aligned in parallel to the central axis; and
       a second housing element having a third angled portion aligned in parallel to the central axis and located opposite to the first angled portion, the second housing element being secured by the second angled portion;
    a shaft positioned to move reciprocally along the center axis;
    an alignment element positioned at least partially inside the housing, the alignment element being secured by the first angled portion, the alignment element having a first protrusion extending in front of and at least partially across a recess formed in the alignment element, the alignment element being at least partially made of a first material; and
    a sealing element positioned at least partially inside the housing and fixedly attached with the alignment element, the sealing element having a second protrusion extending toward and sealingly in contact with the shaft, the sealing element being at least partially made of a second material; and
    wherein the first material has less elasticity than the second material;
    wherein a first radial distance between the first angled portion relative to the center axis is smaller than a second radial distance between the second angled portion relative to the center axis; and
    wherein a third radial distance between the third angled portion relative to the center axis is generally the same as the first radial distance.

12. The shaft system of claim 11, wherein the first protrusion is configured to at least partially remove an external substance from the shaft.

13. The shaft system of claim 11, wherein the first protrusion extends toward an external side of the shaft system.

14. The shaft system of claim 11, wherein the second protrusion is configured to facilitate sealing a lubricant positioned on a lube side of the shaft system.

15. The shaft system of claim 11, wherein the second protrusion extends towards a lube side of the shaft system.

* * * * *